United States Patent
Iwanaga et al.

(10) Patent No.: US 8,338,030 B2
(45) Date of Patent: Dec. 25, 2012

(54) NON-AQUEOUS ELECTROLYTE SECONDARY BATTERY

(75) Inventors: Masato Iwanaga, Tokushima (JP); Nobumichi Nishida, Tokushima (JP); Shuji Tsutsumi, Tokushima (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 1132 days.

(21) Appl. No.: 11/359,965

(22) Filed: Feb. 23, 2006

(65) Prior Publication Data

US 2006/0199077 A1 Sep. 7, 2006

(30) Foreign Application Priority Data

Feb. 24, 2005 (JP) .................. 2005-048171

(51) Int. Cl.
*H01M 4/52* (2010.01)
(52) U.S. Cl. ............. 429/231.95; 429/231.9; 429/188; 429/224; 429/231.3
(58) Field of Classification Search ............ 429/231, 429/231.95, 188
See application file for complete search history.

(56) References Cited

U.S. PATENT DOCUMENTS

| | | | |
|---|---|---|---|
| 6,551,744 B1 | 4/2003 | Ohzuku et al. | |
| 2003/0180618 A1* | 9/2003 | Inoue et al. | 429/231.1 |
| 2005/0026043 A1* | 2/2005 | Kang et al. | 429/330 |
| 2005/0221185 A1* | 10/2005 | Sakata et al. | 429/231.8 |

FOREIGN PATENT DOCUMENTS

| | | |
|---|---|---|
| JP | 4-319260 | 11/1992 |
| JP | 10-275632 | 10/1998 |
| JP | 2002-42813 | 2/2002 |
| JP | 2004-214139 | 7/2004 |
| JP | 2004-296098 | 10/2004 |
| JP | 2004-299975 | 10/2004 |
| JP | 2004-349131 | 12/2004 |

OTHER PUBLICATIONS

Electrochemical and Solid-State Letters, vol. 4 (12) pp. A200-A203(2001).

* cited by examiner

*Primary Examiner* — Jane Rhee
(74) *Attorney, Agent, or Firm* — Westerman, Hattori, Daniels & Adrian, LLP

(57) ABSTRACT

A non-aqueous electrolyte secondary battery with excellent discharge cycle characteristics and a charging termination potential ranging from 4.4 to 4.6 V based on lithium, consisting of a positive electrode comprising a positive electrode active material, a negative electrode, and a non-aqueous electrolyte containing a non-aqueous solvent and an electrolyte salt, in which the positive electrode active material comprises a mixture of a lithium-cobalt composite oxide containing at least both zirconium and magnesium in $LiCoO_2$, and a lithium-manganese-nickel composite oxide having a layered structure and containing at least both manganese and nickel, and the potential of the positive electrode active material ranges from 4.4 to 4.6 V based on lithium, and the non-aqueous electrolyte contains at least one of aromatic compounds selected from the group consisting at least of toluene derivatives, anisole derivatives, biphenyl, cyclohexyl benzene, tert-butyl benzene, tert-amyl benzene, and diphenyl ether.

5 Claims, 1 Drawing Sheet

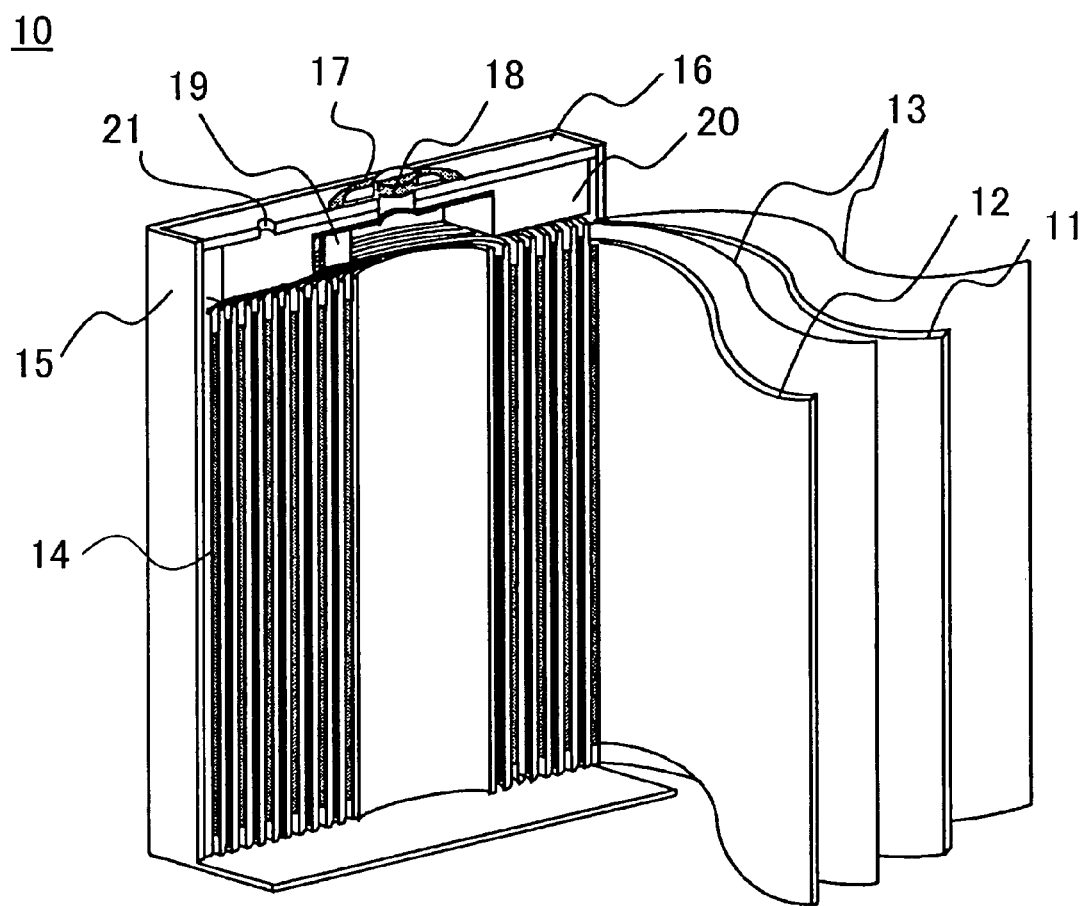

NON-AQUEOUS ELECTROLYTE SECONDARY BATTERY

BACKGROUND OF THE INVENTION

1. Field of the Invention

The present invention concerns a non-aqueous electrolyte secondary battery charged at a high voltage using a positive electrode active material that is charged at a charge termination potential ranging from 4.4 to 4.6 V based on lithium and more specifically, to a non-aqueous electrolyte secondary battery excellent in cycle characteristics charged at a charge termination potential ranging from 4.4 to 4.6 V based on lithium using a positive electrode active material comprising a mixture of a lithium-cobalt composite oxide containing at least both of zirconium and magnesium in $LiCoO_2$, and a lithium-manganese-nickel composite oxide having a layered structure and containing at least both of manganese and nickel.

2. Description of the Related Art

Along with the rapid and widespread use of portable electronic equipments, specifications required for batteries used therein have become more and more stringent, and those that are small in size, thinly shaped, yet have high capacity, and exhibit excellent cycle characteristics and stable performance have become particularly desirable. In the field of secondary batteries, non-aqueous electrolyte lithium secondary batteries have been noted for higher energy density compared with batteries of other types such that the market share of non-aqueous lithium electrolyte secondary batteries has remarkably grown.

In equipment where the non-aqueous electrolyte secondary battery of the above-described type is used, the battery is square-shaped as it is formed by disposing the power generation elements in a square outer casing and the space for containing the battery is often square-shaped in the form of a flat box. An example of such a square-shaped non-aqueous electrolyte secondary battery is described hereafter with reference to FIG. 1.

FIG. 1 is a perspective view along the longitudinal direction of a square-shaped non-aqueous electrolyte secondary battery of prior art. In a non-aqueous electrolyte secondary battery 10, a flat spiral electrode body 14, in which a positive electrode plate 11 and a negative electrode plate 12 are wound while interposing a separator 13 therebetween is contained inside a square battery outer case 15 which is sealed by a sealing plate 16.

The spiral electrode body 14 is wound such that the positive electrode plate 11 is exposed while being positioned at the outermost periphery of the spiral electrode body 14, at which it is in direct contact with and electrically connected to the inner surface of the battery outer case 15 which also serves as a positive electrode terminal. Further, the negative electrode plate 12 is formed at the center of the sealing plate 16 and connected electrically to a negative electrode terminal 18 through a collector 19, where the negative electrode terminal 18 is attached through an insulator 17 that also serves as a negative electrode terminal.

Then, since the battery outer case 15 is electrically connected to the positive electrode plate 11 to prevent the occurrence of short circuit between the negative electrode plate 12 and the battery outer case 15, an insulation spacer 20 is inserted between the upper end of the spiral electrode body 14 and the sealing plate 16, thereby electrically insulating the negative electrode plate 12 and the battery outer case 15 from each other.

The square-shaped non-aqueous electrolyte secondary battery is produced by inserting the spiral electrode body 14 into the battery outer case 15, laser welding the sealing plate 16 to the opening of the battery outer case 15, then injecting a non-aqueous electrolyte from an electrolyte injection port 21 and tightly closing the electrolyte injection port 21. Such a square-shaped non-aqueous electrolyte secondary battery provides excellent effects by taking up less space during use and having high performance and reliability.

The negative electrode active material used in the above-described non-aqueous electrolyte secondary consists of carbonaceous materials such as graphite and amorphous carbon which are generally used because of their excellent properties of initial efficiency and high safety by inhibiting the growth of dendrites, and have satisfactory potential flatness as well as high density while having a discharge potential comparable to that of a lithium metal or lithium alloy.

Further, carbonates, lactones, ethers, esters, etc. are used singly or in combination as non-aqueous solvent for the non-aqueous electrolyte. In particular, carbonates having high dielectric constant and high ionic conductivity are often used to produce the non-aqueous electrolyte.

Since the non-aqueous electrolyte of the non-aqueous electrolyte secondary battery may sometimes overheat due to over charging or short circuit as to evolve gases leading it to swell, ignite or explode, various additives are used together to ensure safety performance. For example, JP-A No. 2004-214139 (claims; Patent Document 1) discloses an example of using a cyclic carbonate ester of an unsaturated hydrocarbon as non-aqueous solvent and using at least one member selected from the group consisting of cyclohexyl benzene and derivatives thereof and at least one member selected from the group consisting of vinylene carbonate, vinylethylene carbonate and derivatives thereof as an additive for ensuring safety of the battery upon overcharging.

Further, JP-A No. 2004-349131 (claims; Patent Document 2) discloses a non-aqueous electrode to which an aromatic compound represented by the following chemical formula (I) is added:

[Formula 1]

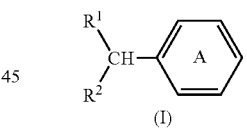

(I)

where each of $R^1$ and $R^2$ independently represents an alkyl group which may have a substituent, or, $R^1$ and $R^2$ may be joined to form a hydrocarbon ring which may have a substituent, where the ring A may have a substituent and at least one carbon atom adjacent to carbon atoms to which $R^1R^2CH$— is bonded has a substituent).

Further, JP-A No. 10-275632 (claims; Patent Document 3) discloses a non-aqueous electrolyte containing a non-ionic aromatic compound having an alkyl group.

On the other hand, it has been publicly known that a 4 V class non-aqueous electrolyte secondary battery of high energy density can be obtained by using the combination of a positive electrode active material comprising a lithium composite oxide such as $LiCoO_2$, $LiNiO_2$, $LiMnO_2$, $LiMn_2O_4$, $LiFeO_2$, etc. and a negative electrode comprising a carbon material. Among these lithium composite oxides, $LiCoO_2$ has often been used because the batteries exhibit various excellent characteristics compared to others. However, since cobalt is expensive and natural resources are rather limited, efforts have been made to determine whether other transition elements which may yield battery characteristics that are equal to or even exceed those obtained by using cobalt may be substituted, as demand continues to grow for non-aqueous electrolyte secondary batteries with better performance and longer life.

For example, a method of adding foreign elements such as Zr or Mg to $LiCoO_2$ for the purpose of improving the characteristics of a non-aqueous electrolyte secondary battery using $LiCoO_2$ as positive electrode active material has been disclosed in JP-A No. H4-319260 (claims, and columns [0006], [0008] to [0011]; Patent Document 4) and JP-A No. 2004-299975 (claims, and columns [0006] to 00008); Patent Document 5). Patent Document 4 discloses a non-aqueous electrolyte secondary battery capable of generating a high voltage and showing excellent charge/discharge and shelf life characteristics by adding zirconium to $LiCoO_2$ as positive electrode active material. When zirconium is added to $LiCoO_2$ as positive electrode active material, the surface of $LiCoO_2$ particles is stabilized by being covered with zirconium oxide ($ZrO_2$) or composite oxide of lithium and zirconium ($Li_2ZrO_3$) and, as a result, a positive electrode active material showing excellent cycle and shelf life characteristics can be obtained without causing decomposing reaction in the electrolyte or destruction of crystals even at high potential. Such effect cannot be obtained by merely mixing $LiCoO_2$ after burning with zirconium or zirconium compound but is obtained by adding zirconium to a mixture of lithium salt and the cobalt compound and burning them. Patent Document 5 also discloses that by adding not only zirconium (Zr) but also at least one other member such as titanium (Ti) and fluorine (F) as foreign elements to $LiCoO_2$ as positive electrode active material, the load and cycle characteristics of the non-aqueous electrolyte lithium secondary battery can be improved.

Further, JP-A No. 2002-042813 (claims and columns [0011]-[0016]; Patent Document 6) discloses a non-aqueous electrolyte secondary battery capable of generating a high voltage and showing excellent charge/discharge characteristics and high capacity by using an Li-transition metal composite oxide having a layered structure in which the compositional ratio between Ni and Mn is substantially equal, producing a voltage of about 4 V equal to that produced by $LiCoO_2$, while JP-A No. 2004-296098 (claims; Patent Document 7) disclose that by using a positive electrode active material containing at least Ni and Mn as transition metals and a lithium-transition metal composite oxide having a layered structure further containing fluorine, a non-aqueous electrolyte secondary battery capable of being charged at a charging voltage of 4.4 V or higher and excellent in thermal stability can be obtained, by combining the positive electrode active material with the negative electrode containing a carbon material as negative electrode active material. Further, Electrochemical and Solid-State Letters 4 (12) A200-A203 (2001) (Non-Patent Document 1) show a battery with specifically high thermal stability even in a charged state (high oxidized state) when, from among the lithium transition metal composite oxides above-mentioned, that which contains Ni, Co and Mn, where the material represented by the chemical formula: $LiMn_xNi_xCo_{(1-2x)}O_2$ is used, in which the compositional ratio between Mn and Ni is equal.

The charging voltage of the current non-aqueous electrolyte secondary battery using a lithium-containing transition metal oxide such as lithium cobalt oxide ($LiCoO_2$) as positive electrode active material and using a carbon material as negative electrode active material, when combined with the negative electrode active material of carbon material such as graphite, ranges from 4.1 to 4.2 V (potential of positive electrode active material is 4.2 to 4.3 V based on lithium). Under such charging condition, only about 50 to 60% of the capacity of the positive electrode is utilized based on theoretical capacity. Accordingly, if the charging voltage can be increased, as much as 70% of the capacity of the positive electrode relative to theoretical capacity can be utilized, or higher, thereby increasing the capacity and energy density of the battery.

In view of the state of developments involving the nature of positive electrode active material for use in the non-aqueous electrolyte secondary battery described above, the present applicant has made various studies to formulate a positive electrode active material which would render a non-aqueous electrolyte secondary battery capable of attaining high charging voltage more stably and in the process has developed a novel non-aqueous electrolyte secondary battery using a mixture of lithium cobalt oxide to which foreign elements are added and layered lithium manganate-nickelate as positive electrode active material, and which invention is now subject of Japanese Patent Applications Nos. 2004-094475 and 2004-320394 (hereinafter collectively referred to as "Prior Applications").

As disclosed in the prior applications, the structural stability of the positive electrode active material of the non-aqueous electrolyte secondary battery is improved at high voltage (about 4.5V) by adding at least Zr and Mg as foreign elements to lithium cobalt oxide and ensuring safety by mixing it with layered lithium manganese nickel oxide of high thermal stability at high voltage. The combination of the positive electrode using such positive electrode active material and the negative electrode comprising negative electrode active material formed of carbon material can yield a non-aqueous electrolyte secondary battery capable of being charged at a high charging voltage of 4.3 V or higher and 4.5 V or lower (4.4V or higher and 4.6 V or lower of charge termination potential based on lithium).

SUMMARY OF THE INVENTION

However, while the non-aqueous electrolyte secondary battery capable of attaining high charging voltage according to the inventions of prior applications can attain higher capacity and higher energy density, its cycle characteristics have been found insufficient compared with those of existing non-aqueous electrolyte secondary batteries charged at 4.2 V rate since the oxidative decomposition of the non-aqueous solvent of the non-aqueous electrolyte is remarkable, causing liquid exhaustion.

In view of the above, the inventors of the present application have repeatedly conducted various experiments with the end in view of decreasing the oxidative decomposition of the non-aqueous solvent in the non-aqueous electrolyte secondary battery to enable it to attain high charging voltage as described above and have determined that this can be achieved by adding a specified aromatic compound in the non-aqueous electrolyte, which remarkably improves the charge/discharge cycle characteristics of the non-aqueous electrolyte secondary battery and renders it capable of attaining high charging voltage.

That is, the present invention intends to provide a non-aqueous electrolyte secondary battery with excellent charge/discharge cycle characteristics where the positive electrode active material used comprises a mixture of a lithium-cobalt composite oxide in which at least both zirconium and magnesium are added to $LiCoO_2$, and lithium-manganese-nickel composite oxide having a layered structure and containing at least both manganese and nickel and is thereby rendered capable of attaining a charging termination potential ranging from 4.4 V to 4.6 V based on lithium The foregoing object can be attained in accordance with the following constitution. The first aspect of the invention provides for a non-aqueous electrolyte secondary battery consisting of a positive electrode comprising a positive electrode active material, a negative electrode, and a non-aqueous electrolyte containing a non-aqueous solvent and electrolyte salt, in which the positive electrode active material is a mixture of a lithium-cobalt composite oxide in which at least both zirconium and magnesium are added to $LiCoO_2$, and lithium-manganese-nickel composite oxide having a layered structure and containing at least both of manganese and nickel, the potential of the positive electrode active material ranges from 4.4 to 4.6 V based on lithium, and the non-aqueous electrolyte contains at least one of aromatic compounds selected from the group consisting at least of toluene derivatives, anisole derivatives, biphenyl, cyclohexyl benzene, tert-butyl benzene, tert-amyl benzene, and diphenyl ether.

In the invention, the lithium-cobalt composite oxide is preferably $Li_aCo_{(1-x-y-z)}Zr_xMg_yM_zO_2$ (in which $0 \leq a \leq 1.1$, $x>0$, $y>0$, $z \geq 0$, $0<x+y+z \leq 0.03$ and M=Al, Ti, Sn). Addition of Zr and Mg as foreign metals is essential. If the amount of foreign metals added in combination with Al, Ti and Sn is insufficient, the improvement in cycle characteristics is negligible. On the other hand, if the amount added is excessive, the initial capacity of the battery diminishes since the foreign metals per se do not contribute to electrode reaction. Further, the layered lithium-manganese-nickel composite oxide is preferably $Li_bMn_sNi_tCo_uO_2$ in which the molar ratio between Ni and Mn is substantially equal (in which $0 \leq b \leq 1.2$, $0<s \leq 0.5$, $0<t \leq 0.5$, $u \geq 0$, $s+t+u=1$, $0.95 \leq s/t \leq 1.05$). An active material of high thermal stability can be obtained by using the composition described above.

Further, the mixing ratio of the lithium-cobalt composite oxide in which both of zirconium and magnesium are added (active material A) and the layered lithium-manganese-nickel composite oxide (active material B) should preferably range from (active material A: active material B) 51:49 to 90:10 and, more preferably, from 70:30 to 80:20. If the active material A is less than 51%, the battery's initial capacity diminishes, thereby adversely affecting cycle and shelf life characteristics. On the other hand, if the active material B is less than 10%, the battery's safety performance is reduced.

Further, in the present invention, carbonates, lactones, ethers, esters, etc. can be used as a non-aqueous solvent constituting a non-aqueous solvent system electrolyte (organic solvent) and two or more of these solvents may be used in admixture. Among them, carbonates, lactones, ethers, ketones, and esters are preferred, with the carbonates being more suitable for use.

Specific examples can include ethylene carbonate (EC), propylene carbonate (PC), butylene carbonate (BC), vinylene carbonate (VC), cyclopentanone, sulfolane, 3-methyl sulfolane, 2,4-dimethyl sulfolane, 3-methyl-1,3-oxazolidine-2-one, dimethyl carbonate (DMC), methyl ethyl carbonate (MEC), diethyl carbonate (DEC), methyl propyl carbonate, methyl butyl carbonate, ethyl propyl carbonate, ethyl butyl carbonate, dipropyl carbonate, γ-butyrolactone, γ-valerolactone, 1,2-dimethoxyethane, tetrahydrofuran, 2-methyl tetrahydrofuran, 1,3-dioxolane, methyl acetate, ethyl acetate, and 1,4-dioxane. In the present invention, an EC-containing solvent mixture is preferably used as a means of enhancing the battery's charge/discharge efficiency. Generally, since cyclocarbonates are easily oxidatively decomposed at high potential, the EC content of the non-aqueous solvent should preferably be 5 vol % or more and 25 vol % or less.

As solute for the non-aqueous electrolyte of the non-aqueous electrolyte secondary battery of the invention, lithium salts are generally used, examples of which are $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}Cl_{12}$, and mixtures thereof. Among them, $LiPF_6$ (lithium hexafluoro phosphate) is preferably used. When the battery is charging at a high charging voltage, aluminum as positive electrode collector tends to dissolve easily, such that the existing $LiPF_6$ decomposes to form a coat on the aluminum surface, which then suppresses dissolution of the aluminum. Accordingly, the use of $LiPF_6$ as lithium salt is preferred. The amount of solute to be dissolved in the non-aqueous solvent preferably ranges from 0.5 to 2.0 mol/L.

The second aspect of the invention provides for a non-aqueous electrolyte secondary battery according to the first aspect of the invention, whereby the content of the aromatic compound is 0.5 mass % or more and 5 mass % or less based on the entire electrolyte.

The third aspect of the invention provides for a non-aqueous electrolyte secondary battery according to the first or second aspect of the invention wherein the non-aqueous electrolyte further contains vinylene carbonate (VC).

The fourth aspect of the invention provides for a non-aqueous electrolyte secondary battery according to the first aspect of the invention wherein the lithium-manganese-nickel composite oxide of the positive electrode active material further contains cobalt.

The invention having the afore-mentioned constitution provides excellent effects described herein below. That is, according to the first aspect of the invention, since the non-aqueous electrolyte contains at least one of aromatic compounds selected from the group consisting at least of toluene derivatives, anisole derivatives, biphenyl, cyclohexyl benzene, tert-butyl benzene, tert-amyl benzene, and diphenyl ether, oxidative decomposition of the non-aqueous solvent in the non-aqueous electrolyte is reduced, making it possible to obtain a non-aqueous electrolyte secondary battery with improved cycle characteristics, where the charge termination potential of the positive electrode active material can range as high from 4.4 V to 4.6 V based on lithium. While the reason for such phenomenon is not yet apparent at present, it is presumed that since the aromatic compound referred to above is a compound that generates an oxidizing current with a potential range of 4.5 V or higher and 5.5 V or lower based on lithium in the positive electrode, the aromatic compound is oxidized before oxidative decomposition of the solvent of the electrolyte ensues, thereby acting to suppress the oxidative decomposition of the solvent of the electrolyte.

Further, according to the second aspect of the invention, if the aromatic compound is less than 0.5 mass%, the desired improvement in cycle characteristics cannot be obtained while on the contrary, cycle characteristics deteriorate if the aromatic compound exceeds 5 mass %. Therefore, favorable cycle characteristics can be obtained if the aromatic compound is within the range of 0.5 mass % or more and 5 mass % or less.

Further, according to the third aspect of the invention, since the addition of vinylene carbonate (VC), which is customarily used as an additive for suppressing the reductive decomposition of an organic solvent, causes the formation of a negative electrode surface coat (or Solid Electrolyte Interface, which is also referred to as a passivation layer, hereinafter "SEI") on the negative electrode active material layer before lithium is intercalated to the negative electrode by initial charging, and the SEI functions as a barrier to inhibit the intercalation of solvent molecules in the periphery of lithium ions, the negative electrode active material does not directly react with the organic solvent and, accordingly, the objective of improving the battery's cycle characteristics is achieved as to obtain a non-aqueous electrolyte secondary battery with a longer life. The amount of VC to be added is from 0.5 to 5 mass % but preferably, from 1 to 3 mass % based on the entire electrolyte. Where the amount of VC added is less than 0.5 mass %, the resulting improvement in cycle characteristics is insufficient while on the contrary, if the amount of VC added exceeds 3 mass %, the initial capacity of the battery diminishes and leads to swelling of the battery at high temperature, which is therefore not desirable.

Further, according to the fourth aspect of the invention, since the lithium-transition metal composite oxide containing Ni, Co, and Mn, particularly, the material represented by the chemical formula $LiMn_xNi_xCo_{(1-2x)}O_2$ with the compositional ratio between Mn and Ni being equal and the battery specifically shows high thermal stability even in a charged state (highly oxidized state), a non-aqueous electrolyte secondary battery which is safe even when charged at a high charging voltage can be obtained.

BRIEF DESCRIPTION OF THE DRAWING

Preferred embodiments of the present invention will be described in detail based on FIG. 1, which is a perspective view along the vertical cross section of one existent square-shaped non-aqueous electrolyte secondary battery.

DESCRIPTION OF THE PREFERRED EMBODIMENTS

The present invention will be described in detail with reference to preferred embodiments for practicing the invention by using examples and comparative examples. However, the examples explained below merely pertain to a non-aqueous electrolyte secondary battery embodying the technical idea of the present invention, and are not intended to restrict the application of the invention as the invention may equally apply to various other modifications without departing from the technical idea shown in the scope of the claims for a patent of the invention.

First, the specific method of manufacturing a non-aqueous electrolyte secondary battery common to the production of batteries referred to as examples and the comparative example will be described.

Making of the Positive Electrode

Foreign element-added lithium cobalt oxide is prepared as described below. As starting material, lithium carbonate ($Li_2CO_3$) is used as lithium source, and zirconium and magnesium-added tricobalt tetraoxide ($Co_3O_4$), obtained by co-precipitation from an aqueous solution to which 0.2 mol % of zirconium (Zr) and 0.5 mol % of magnesium (Mg) are added as foreign elements to cobalt upon synthesis of cobalt carbonate followed by heat decomposing reaction, is used as cobalt source. After weighing a predetermined amount of each and mixing them, the resulting mixture is burned in the atmosphere at 850° C. for 24 hours to obtain zirconium and magnesium-added lithium cobalt oxide, which is then pulverized in a mortar into an average grain size of 14 μm to obtain a positive electrode active material A.

The layered lithium manganate-nickelate is prepared as described below. As starting material, lithium carbonate ($Li_2CO_3$) is used as lithium source and co-precipitated hydroxide represented by $Ni_{0.33}Mn_{0.33}Co_{0.34}(OH)_2$ is used as the transition metal source. After weighing a predetermined amount of each and mixing them, the resulting mixture is burned in the atmosphere at 1000° C. for 20 hours to obtain a cobalt-containing layered lithium manganate-nickelate represented by $LiMn_{0.33}Ni_{0.33}Co_{0.34}O_2$, which is then pulverized in a mortar into an average grain size of 5 μm, to obtain a positive electrode active material B.

The thus obtained positive electrode active material A and the positive electrode active material B are mixed to have a mass ratio of 7:3 and then mixed such that the mixed positive electrode active material constitutes 94 mass parts, the carbon powder as conductive agent constitutes 3 mass parts, and the polyvinylidene fluoride powder as binder constitutes 3 mass parts. The mixed positive electrode active material is thereafter mixed with an N-methyl pyrrolidone (NMP) solution to prepare slurry, which is then applied to and dried on both surfaces of an aluminum positive electrode collector by means of the doctor blade method to form an active material layer on both surfaces of the positive electrode collector. Subsequently, the dried slurry is compressed using a compression roller, thereby resulting in a positive electrode with a length of 36.5 mm on the shorter side thereof.

Making of the Negative Electrode

Graphite powder of 95 mass parts, carboxymethyl cellulose (CMC) of 3 mass parts as viscosity improver and a styrene butadiene rubber (SBR) of 2 mass parts as a binder are dispersed in water to prepare slurry, which is then applied to both surfaces of a negative electrode collector made of copper at a thickness of 8 μm by means of the doctor blade method. Subsequently, the dried slurry is compressed using a compression roll thereby resulting in a negative electrode with a length of 37.5 mm on the shorter side thereof. The potential of graphite is 0.1 V based on lithium. When the potential of the positive electrode active material based on lithium is at 4.4 V for example, voltage of the battery where graphite has been used in the negative electrode is 4.3 V.

The amount of coating of the positive electrode and the negative electrode is controlled by measuring the charging capacity of the positive electrode active material per 1 g thereof at a charging voltage as the design criterion for a three-electrode type cell (counter electrode: lithium metal, reference electrode: lithium metal), such that the resulting charging capacity ratio (negative charging capacity/positive pole charging capacity) is 1.1 based on the obtained data and the theoretical charging capacity of the graphite negative electrode. While the charging capacity of the positive electrode active material changes depending on the charging voltage, Table 1 shows the relation between the charged positive electrode potential and the positive electrode capacity in the case where zirconium and magnesium are added to lithium cobalt oxide/layered lithium manganate-nickelate (mixing ratio 7:3) as an example.

TABLE 1

| Positive electrode charged potential (vs. Li/Li$^+$) | Positive electrode charged capacity (mAh/g) |
| --- | --- |
| 4.3 V | 166 |
| 4.4 V | 182 |
| 4.5 V | 200 |
| 4.6 V | 230 |
| 4.7 V | 240 |

Preparation of the Electrolyte

To form an electrolyte for the manufacture of a battery, $LiPF_6$ is dissolved at the rate of 1 mol/L in a solvent mixture comprising 20 vol % of ethylene carbonate (EC), 50 vol % of methyl ethyl carbonate (MEC), and 30 vol % of diethyl carbonate (DEC). Then, a predetermined content of aromatic compound is added based on the entire mass of the electrolyte. Electrolytes of 8 types were prepared in which aromatic compounds were added, and the contents thereof, respectively, are: cyclohexyl benzene (CHB): 0.5 mass % (Example 1), CHB: 0.1 mass %+tert-amyl benzene (TAB): 2.9 mass % (Example 2), TAB: 3.0 mass % (Example 3), biphenyl (BP): 3.0 mass % (Example 4), diphenyl ether (DPE): 3.0 mass % (Example 5), TAB: 5.0 mass % (Example 6), no additive (Comparative Example 1) and TAB: 7.0 mass % (Comparative Example 2).

Manufacture of the Battery

Eight types of square-shaped non-aqueous electrolyte secondary batteries (5 mm×34 mm×43 mm) correspondingly referred to as Examples 1 to 6 and Comparative Examples 1 and 2 were manufactured by using the positive electrode, the negative electrode, and the non-aqueous electrolytes constituted as described above and using a finely porous polyethylene film as separator.

Measurement of Charge/Discharge Cycle Characteristics

For each type of battery manufactured as described above, a charge/discharge cycle test was conducted under the charging/discharging conditions cited below. The charge/discharge cycle test is conducted in a thermostatic bath maintained at 35° C. and the voltage value is based on lithium in each of the cases. Initially, each battery is charged at a constant current of 1 It (1C) until the battery voltage reaches 4.4 V, and is charged thereafter at a constant voltage of 4.4 V until the current value reaches 1/50 It. Then, each battery is discharged at a constant current of 1 It until the battery voltage reaches 3.0 V and the discharge capacity at this instance is determined as battery initial capacity. To measure their charge/discharge cycle characteristics, each of the batteries measured for initial capacity is charged at a constant current of 1 It until the battery voltage reaches 4.4 V, then charged at a constant voltage of 4.4 V until the current value reaches 1/50 It, and then discharged at a constant current of 1 It until the battery voltage reaches 3.0 V. The charge and discharge procedures are defined as 1 cycle, which is repeated up to 300 cycles and the discharge capacity after 300 cycles is thereafter determined. Then, the capacity remaining rate (%) after 300 cycles at 35° C. is determined as the cycle characteristic value for each of the batteries according to the following formula. The results obtained are collectively shown in Table 2.

Capacity remaining rate (%)=(discharge capacity after 300 cycles/initial capacity)×100

TABLE 2

| | Aromatic compound | Cycle characteristic (300 cycles at 35° C.) |
|---|---|---|
| Comp. Example 1 | None | 56% |
| Example 1 | CHB (0.5 mass %) | 65% |
| Example 2 | CHB (0.1 mass %) + TAB (2.9 mass %) | 75% |
| Example 3 | TAB (3.0 mass %) | 78% |
| Example 4 | BP (3.0 mass %) | 61% |
| Example 5 | DPE (3.0 mass %) | 66% |
| Example 6 | TAB (5.0 mass %) | 69% |
| Comp. Example 2 | TAB (7.0 mass %) | 48% | where:
CHB represents cyclohexyl-benzene;
TAB represents tert-amyl benzene;
BP represents biphenyl;
DPE represents diphenyl-ether Based on the results shown in Table 2, the following conclusion can be made. Comparing the results obtained for Comparative Example 1 and Example 1, it can be gleaned that the capacity remaining rate increases greatly after 300 cycles at 35° C. even when the content of the aromatic organic compound in the non-aqueous electrolyte is as low as 0.5 mass %. However, if the results obtained for Example 6 were to be compared with those of Comparative Example 2, it is obvious that the capacity remaining rate after 300 cycles at 35° C. abruptly falls if the content of the aromatic organic compound in the non-aqueous electrolyte exceeds 5 mass %. Accordingly, it can be concluded that the content of the aromatic organic compound in the non-aqueous electrolyte should preferably be 0.5 mass % or more and 5 mass % or less based on the entire amount of the non-aqueous electrolyte.

Further, in cases where the content of the aromatic organic compound in the non-aqueous electrolyte is within the range of 0.5 mass % or more and 5 mass % or less, the batteries yield the same capacity remaining rate in case any one of the aromatic compounds CHB, TAB, BP and DPE are used, or a combination thereof. While only the results of using CHB, TAB, BP, and DPE are reflected in Table 2, such results are not restrictive, since the same effect can also be achieved by adding at least one of the aromatic compounds selected from the group consisting at least of toluene derivatives, anisole derivatives, BP, CHB, ter-butyl benzene (TBB), TAB, and DPE.

From the results described above, it has been derived that cycle characteristics can be greatly enhanced by adding at least one of the aromatic compounds selected from the group consisting at least of toluene derivatives, anisole derivatives, BP, CHB, TBB, TAB, and DPE to the non-aqueous electrolyte in a non-aqueous electrolyte secondary battery charged at a high charge termination voltage of 4.3 V to 4.5 V (4.4 V to 4.6 V of positive electrode potential based on lithium) using a mixture of lithium-cobalt composite oxide in which at least both of zirconium and magnesium are added to $LiCoO_2$ and lithium manganate nickelate having a layered structure as positive electrode active material and graphite as negative electrode active material.

While solvent mixtures comprising EC, MEC, and DEC as non-aqueous solvent were used in obtaining the results for Examples 1 to 6 and Comparative Examples 1 and 2, it will be apparent that various kinds of non-aqueous solvents already known can be used. However, while cyclic carbonate is preferably added in view of its role in increasing the charge/discharge efficiency of the battery, it is significant to limit the content of cyclic carbonate to 5 vol % or more and 25 vol % or less in the non-aqueous solvent particularly where EC is used, since it has a tendency to decompose oxidatively at high potential.

Further, vinylene carbonate (VC), which is customarily used as an additive for suppressing the reductive decomposition of an organic solvent, may alternatively be added to the non-aqueous electrolyte in the amount ranging from 0.5 to 5 mass %, but preferably from 1 to 3% mass % based on the entire electrolyte. Since the addition of VC causes the formation of a negative electrode surface coat (or Solid Electrolyte Interface, which is also referred to as a passivation layer, hereinafter "SEI") on the negative electrode active material layer before lithium is intercalated to the negative electrode by initial charging, and the SEI functions as a barrier to inhibit the intercalation of solvent molecules in the periphery of lithium ions, the negative electrode active material does not directly react with the organic solvent and, accordingly, the effect of improving the battery's cycle characteristics is achieved as to obtain a non-aqueous electrolyte secondary battery with a longer life. Where the amount of VC added is less than 0.5 mass %, the resulting improvement in cycle characteristics is insignificant while on the contrary, the initial capacity of the battery diminishes if the amount of VC added exceeds 3 mass %, leading to swelling of the battery at high temperature, which is therefore not desirable.

Further, while the lithium-cobalt composite oxide to which zirconium and magnesium are added was used as positive electrode active material A in obtaining the results for Examples 1 to 6 and Comparative Examples 1 and 2, lithium transition metal composite oxides represented by the following chemical formula (1) containing other elements M (M: Al, Ti, Sn) aside from zirconium and magnesium can also be used as additives to form the positive electrode active material:

$$Li_aCo_{(1-x-y-z)}Zr_xMg_yM_zO_2 \qquad (1)$$

(where $0 \leq a \leq 1.1$ x>0, y>0, $z \geq 0$, $0 < x+y+z \leq 0.03$ and M=Al, Ti, Sn).

In this case the addition of Zr and Mg is essential and if the amount of foreign metals added in combination with Al, Ti, and Sn is insufficient, the improvement in cycle characteristics is negligible. On the contrary, the initial capacity of the battery diminishes if the amount of additive is excessive, since such foreign metals do not directly contribute to electrode reaction. The amount is preferably on the basis of $x \geq 0.0001$, $y \geq 0.0001$, $0.0002 \leq x+y+z \leq 0.03$.

Further, while $LiMn_{0.33}Ni_{0.33}Co_{0.34}O_2$ having the layered structure was used as positive electrode active material B in obtaining the results for Examples 1 to 6 and Comparative examples 1 and 2, any of lithium-manganese-nickel composite oxides represented by the following chemical formula (2) with the compositional ratio between Mn and Ni being substantially equal can be used.

$$Li_bMn_sNi_tCo_uO_2 \qquad (2)$$

(where $0 \leq b \leq 1.2$, $0 < s \leq 0.5$, $0 < t \leq 0.5$, $u \geq 0$, $s+t+u=1$, $0.95 \leq s/t \leq 1.05$).

In the lithium-manganese-nickel composite oxide having the layered structure represented by the chemical formula (2) mentioned above, the presence of Mn and Ni is essential and if the compositional ratio between Mn and Ni is substantially equal, the active material would have high thermal stability. The amount is preferably on the basis of $0.1 \leq s \leq 0.5$, and $0.1 \leq t \leq 0.5$.

The lithium-manganese-nickel composite oxide having a layered structure may likewise comprise a lithium-manganese-nickel composite oxide represented by the following chemical formula (3), which further contains a trace of at least one of other metals selected from Mg, Zr, Al, Ti and Sn:

$$Li_bMn_sNi_tCo_uM'_vO_2 \qquad (3)$$

(where $0 \leq b \leq 1.2$, $0.1 \leq s \leq 0.5$, $0.1 \leq t \leq 0.5$, $u \geq 0$, $0.0001 \leq v \leq 0.03$, $s+t+u+v=1$, M'=Mg, Zr, Al, Ti, Sn, $0.95 \leq s/t \leq 1.05$).

The mixing ratio between the active material A and the active material B on the mass ratio usable herein ranges from 51:49 to 90:10 and, preferably, from 70:30 to 80:20. If the active material A is less than 51%, the initial capacity diminishes as to adversely affect cycle and shelf life characteristics. Further, if the active material B is less than 10%, safety performance of the battery deteriorates.

What is claimed is:

1. A non-aqueous electrolyte secondary battery consisting of a positive electrode comprising a positive electrode active material, a negative electrode, and a non-aqueous electrolyte containing a non-aqueous solvent and an electrolyte salt, in which the positive electrode active material comprises a mixture of a lithium-cobalt composite oxide containing at least both zirconium and magnesium in $LiCoO_2$, and a lithium-manganese-nickel composite oxide having a layered structure and containing at least both of manganese and nickel, the potential of the positive electrode active material ranges from 4.4 to 4.6 V based on lithium, and the non-aqueous electrolyte contains at least one of aromatic compounds selected from the group consisting at least of biphenyl, cyclohexyl benzene, tert-amyl benzene, and diphenyl ether;

whereby the content of the aromatic compound is 0.5 mass % or more and 5 mass % or less based on the entire electrolyte.

2. A non-aqueous electrolyte secondary battery according to claim 1, wherein the non-aqueous electrolyte further contains vinylene carbonate.

3. A non-aqueous electrolyte secondary battery according to claim 1, wherein the lithium-manganese-nickel composite oxide of the positive electrode active material further contains cobalt.

4. A non-aqueous electrolyte secondary battery according to claim 1, wherein the lithium-manganese-nickel composite oxide having a layered structure is a compound represented by the chemical formula (2)

$$Li_bMn_sNi_tCo_uO_2 \qquad (2)$$

wherein $0 \leq b \leq 1.2$, $0 < s \leq 0.5$, $0 < t \leq 0.5$, $u \geq 0$, $s+t+u=1$, and $0.95 \leq s/t \leq 1.05$.

5. A non-aqueous electrolyte secondary battery according to claim 1, wherein the lithium-manganese-nickel composite oxide having a layered structure is a compound represented by the chemical formula (3)

$$Li_bMn_sNi_tCo_uM'_vO_2 \qquad (3)$$

where $0 \leq b \leq 1.2$, $0.1 \leq s \leq 0.5$, $0.1 \leq t \leq 0.5$, $u \leq 0.0001 \leq v \leq 0.03$, $s+t+u+v=1$, M'=Mg, Zr, Al, Ti, and/or Sn, and $0.95 \leq s/t \leq 1.05$.

* * * * *